March 31, 1970 G. P. STERNBERG 3,503,344
DOUGH DEVELOPING AGITATING MEANS AND METHOD
Filed Nov. 1, 1968 5 Sheets-Sheet 1

INVENTOR.
GEORGE P. STERNBERG
BY Alfred R. Fuchs
ATTORNEY

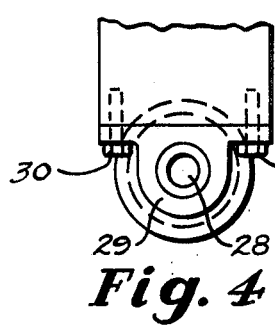
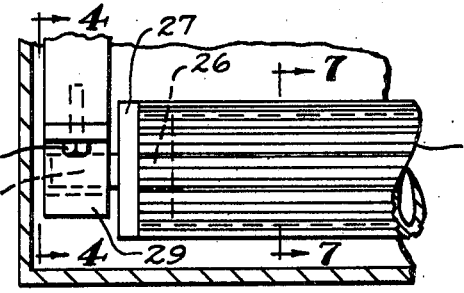
Fig. 4  Fig. 3
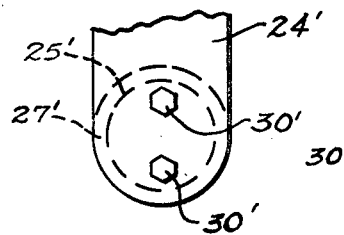
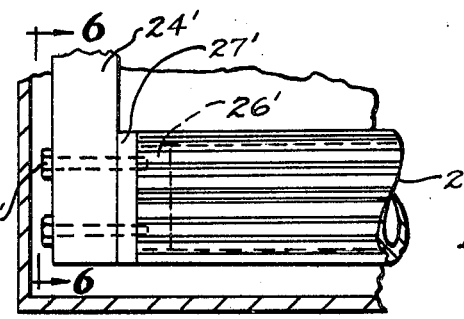
Fig. 6  Fig. 5
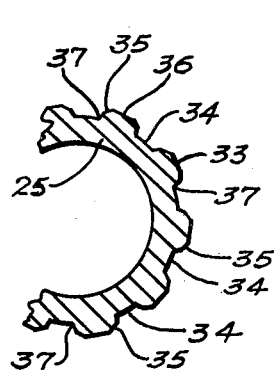
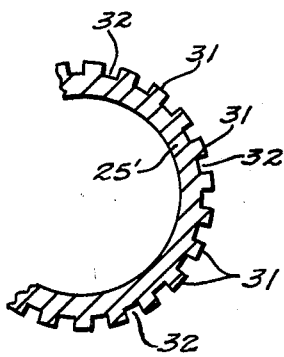
Fig. 7  Fig. 8

March 31, 1970     G. P. STERNBERG     3,503,344
DOUGH DEVELOPING AGITATING MEANS AND METHOD
Filed Nov. 1, 1968     5 Sheets-Sheet 3

INVENTOR.
GEORGE P. STERNBERG
BY
*Alfred R. Fuchs*
ATTORNEY

March 31, 1970     G. P. STERNBERG     3,503,344
DOUGH DEVELOPING AGITATING MEANS AND METHOD Filed Nov. 1, 1968     5 Sheets-Sheet 5

INVENTOR.
GEORGE P. STERNBERG
BY
*Alfred R. Fuchs*
ATTORNEY

United States Patent Office 3,503,344
Patented Mar. 31, 1970

3,503,344
DOUGH DEVELOPING AGITATING MEANS AND METHOD
George P. Sternberg, 3740 Wyoming St.,
Kansas City, Mo. 64111
Continuation-in-part of application Ser. No. 574,079,
Aug. 22, 1966. This application Nov. 1, 1968, Ser.
No. 772,792
Int. Cl. A21c 1/06
U.S. Cl. 107—40                                          11 Claims

ABSTRACT OF THE DISCLOSURE

A circular series of uniformly spaced agitator bars equidistant from the horizontal axis of agitator rotation having longitudinally extending wide, flat topped gripping ribs either rectangular or tapering in cross section with downwardly diverging side walls, the ribs being either continuous or rows of short ribs. Rotation of the bars about their own axes and around the axis of an arcuate wall portion of the bowl produces a continuous rolling pressure and pulling action stretching the gluten continuously in the same direction and carrying the dough around this axis is a continuous stream.

---

This is a continuation-in-part of my application, Ser. No. 574,079, filed Aug. 22, 1966 now abandoned on Dough Developing Agitator Member and Method. My invention relates to dough mixers and more particularly to agitating members for a dough mixer and a method of developing the gluten in a dough by means of such agitating members.

In the development of a mass of dough, in a dough mixer, by the conventional batch method, after hydration of the dry materials contained in the batch, the mass of dough is revolved around the center of rotation of the agitating means and during at least part of the time a substantial portion of the dough mass is in contact with the bottom, front or back of the mixer bowl. The dough has a tendency to stick or adhere to these walls of the container, the force opposing this sticking tendency is produced by the agitator bars of the agitating means of the mixer, which are ordinarily smooth in character. Due to lack of gripping action by these smooth surfaced agitator bars, as the same travel about the center of rotation of the agitating means, when they move in proximity to the wall, slippage occurs between the mass of dough and the agitator bars and the amount of pulling exerted by the bars is thus relatively small. The force tending to pull the dough away from the wall adjacent which an agitator bar is traveling is thus greatly overbalanced by the inertial tendency of the dough mass to adhere to the mixer wall. This causes the mass of dough in the mixer to break contact with the mixer bars usually as the bars pass through the upper portion of their circular path of travel, resulting in an irregular or intermittent travel of the mass of dough around the axis of rotation, and considerable slapping around of the dough in the mixer. This causes a change in position of the dough mass relative to the agitating means so that the action of the bars in exerting a pull on the dough to stretch the gluten is not always in the same direction, such stretching in the same direction being highly desirable in order to get full gluten development in the mixer.

It is accordingly a purpose of my invention to provide dough mixer agitating means, which includes agitator members, such as bars, mounted to rotate about an axis parallel to their length so as to pass in proximity to a curved wall portion of the mixer bowl, that are provided with gripping means over the major portion of the length thereof, so as to increase the traction of the agitating members to overcome the imbalance between the gripping action of the agitating members and the holding action of the wall, thus greatly increasing the dough stretching action of the agitating members in cooperation with the wall.

By increasing greatly the stretching action exerted on the dough by the agitating means, by providing such gripping means thereon, the mixing time for a dough to fully develop the gluten therein, can be considerably reduced and better doughs can be produced, resulting in the production of better bread.

Not only does the provision of gripping means, by roughening the surface of the agitating means, produce more rapid development of the gluten in the dough mass, but it also facilitates or shortens the initial hydration period, in the batch method dough mixing process. This is because the resistance to passage of the roughened surface through the slurry-like material in the mixer is much greater than that of a smooth bar, as it creates more drag and creates a more pronounced movement in the slurry, mixing the liquid and the dry material into a homogeneous mass more quickly.

More specifically it is a purpose of my invention to provide a dough mixer with agitating means, rotating about a fixed axis, which includes agitator members that pass in proximity to a wall portion of the mixer bowl curved about said axis as a center which agitator members are provided with gripping means in the form of alternating projecting portions and recessed or depressed portions on the surface of said agitator members. Said gripping bars are preferably alternately ribbed and grooved to provide the gripping formations. The ribs and grooves on the bars can be either modified V-shape in cross section or approximately rectangular in cross section, extending lengthwise of the agitator bars, parallel to the axis of said bars, and continuously from adjacent one end of each bar to adjacent the other end thereof. When the gripping formations are in the form of protuberances on the bar they are preferably made so as to provide a multiplicity of short, spaced, longitudinal ribs on said bars extending in rows lengthwise of the bars with the protuberances in each of the rows spaced endwise of each other.

It is a purpose of my invention to provide a method of developing the dough which avoids any intermittent rolling wiping and pulling action, such intermittent action resulting in the dough mass being folded over and bounced or slapped haphazardly from one position to another, causing the gluten stretching force to be varied in direction, and causing a compression effect on the gluten in the dough that has previously had the gluten therein stretched. It has been found that it is highly desirable to provide a continuous movement in the same direction for the dough mass that is in the mixer, so as to obtain a stretching action exerted on the gluten of the dough always in the same direction. This produces more thoroughly gluten development for a predetermined mixing time, and makes it possible to reduce the mixing time of a dough batch, in order to get the desired gluten development and avoid any over-development of the gluten.

By providing a continuous pulling action of the dough mass by the agitator bars, made in accordance with my invention, a smooth vibrationless operation of the mixer is obtained. The shocks imparted by the intermittent engagement of the dough mass by the agitator bars in the ordinary dough mixer in which the agitating means rotates around a horizontal axis, due to the dough mixer agitator bars becoming disengaged from the dough, when they move through the upper portion of their circular path, is thus avoided, and the power consumption for developing the gluten in a dough batch is considerably reduced.

By providing the gripping means on the agitator bars in the form of ribs having inclined divergent side walls, spaced uniformly around the bars to provide outwardly widening, longitudinally extending wide shallow grooves in the bars, alternating with the ribs, sufficient gripping action is provided that the dough mass will be continuously pulled by the agitator bars throughout its circular path around the axis of rotation of the agitating means and the dough will readily release from the grooves. During the time that the bars, provided with such gripping means, are moving along a circular path adjacent the curved portion of the mixed bowl, the pulling action of these bars on the dough in cooperation with the resistance to movement of the dough, or tendency of the dough to stick to the mixer bowl wall, will very efficiently stretch the gluten and the stretching action will always be in the same direction. If the agitator bars are mounted for rotation about their own axes there is a combined rolling and pulling action which exerts some compression on the dough mass while exerting the gluten stretching pulling action on the dough that is located in the zone in which said agitator bars are traveling in adjacency to the curved wall. In order to most efficiently confine the dough to a band or zone adjacent the curved wall in its travel around the axis of rotation of the dough mass and the agitating means, a second set of bars may be provided spaced inwardly from the bars that are located at the extremity of the agitating means, to act as baffles for holding the dough to the desired path.

SUMMARY

It is the principal purpose of my invention to provide, in combination with a dough container having a wall portion curved about the axis of rotation of the agitating means within the container, agitator bars that are mounted in a circular series to pass in proximity to the curved wall portion, the bars having dough gripping ribs thereon that have blunt, wide faced extremities, which ribs extend lengthwise of the bars and alternate with wide shallows grooves so as to be uniformly spaced around the bars, and to provide a method of developing a dough by agitating a mass of the dough by said agitating means in a container to stretch the gluten therein constantly in the same direction by pulling on the dough mass continuously in the same direction of rotation to thereby maintain a continuous stream of the dough about the axis of rotation of the agitating means. Other objects and advantages of my invention will appear as the description of the drawings proceeds.

In the drawings:

FIG. 3 is a fragmentary detail sectional view showing one type of agitator bar mounting for my improved agitating means.

FIG. 4 is a fragmentary end view taken on the line 4—4 of FIG. 3.

FIG. 5 is a fragmentary detail view of another type of mounting for the agitator bar of my agitating means.

FIG. 6 is a fragmentary end view taken on the line 6—6 of FIG. 5.

FIG. 7 is a fragmentary sectional view, partly broken away, through the agitator bar shown in FIG. 3, taken one th line 7—7 of FIG. 3.

FIG. 8 is a view similar to FIG. 7 taken on the line 8—8 of FIG. 5 showing a different form of gripping means.

Figure 1:
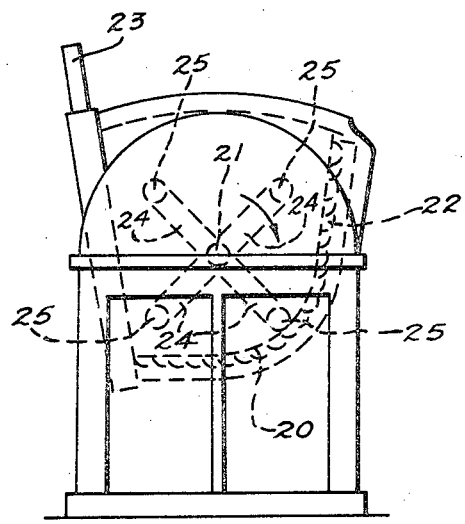
FIG. 1 is a view in end elevation of one type of dough mixer showing my improved agitating means applied thereto.

Referring in detail to the drawings, in FIG. 1 is shown a dough mixer which is provided with a dough container or bowl having a curved wall portion 20, the curved wall portion 20 being curved about the axis of rotation of the agitating means provided in said mixer bowl, said agitating means rotating about the axis of the shaft 21 provided in said mixer bowl. Said shaft 21 is rotated in any desired manner so as to rotate the agitating means in the direction indicated by the arrow in FIG. 1. Suitable refrigerating means 22 may be provided for the mixer bowl and, in the form of the mixer bowl shown in FIG. 1, there is a door portion 23 provided for movement into and out of closing position so that the contents of the mixer can be discharged through the door opening. The agitating means comprises radially extending arms 24, that extend from the shaft 21 as a center, which are provided with my improved agitator bars 25 that are provided with suitable dough gripping means thereon. The detailed structure of the gripping means on said arms is shown in FIGS. 7 to 12 of the drawing as will be explained below.

Figure 2:
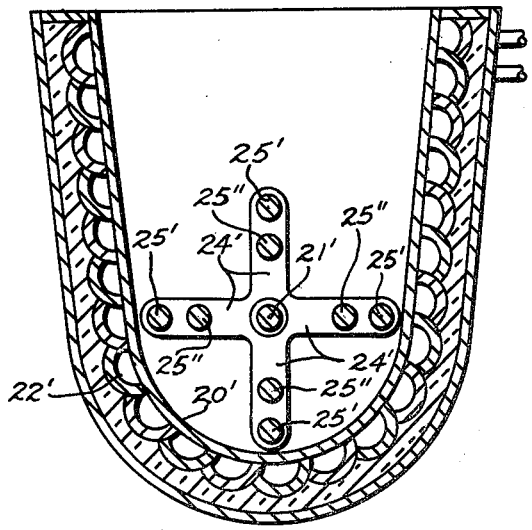
FIG. 2 is a vertical sectional view through a dough mixer bowl of another type showing my improved agitating means applied thereto.

In FIG. 2 a dough mixer bowl of a different type is shown, which is provided with a curved wall portion 20', this type of mixer being provided with means for tilting the same about the axis of the shaft 21' to discharge its contents. Extending radially from the shaft 21' are the arms 24' which are shown as being provided with outer agitator bars 25', that are provided with suitable gripping means thereon, and inner agitation bars 25" that are preferably also provided with gripping means. The bowl is preferably provided with cooling means 22'. The agitating means is driven so as to rotate about the axis of shaft 21' in the direction indicated by the arrow in FIG. 2.

It will be noted that in both the dough mixer shown in FIG. 1 and the dough mixer shown in FIG. 2 the agitator bars 25 or 25', provided with the gripping means, travel in a path that is in close proximity to the curved wall portion 20 or 20' of the dough mixer bowl or dough container. The exact spacing between the bars of the agitating means and the dough mixer wall may be varied as may be found desirable by the user of the dough mixer, and the number of arms 24 or 24' and agitator bars 25 or 25' may be varied as desired.

My invention is adapted to be applied to dough mixer agitating means having agitator bars that rotate about their axes or that are in fixed position on the agitating means. In FIG. 3 and 4 a mounting for one of the agitator bars for rotation about its own axis is disclosed. The body of the agitator bar is shown tubular, but may be solid, and is shown as provided with a plug 26 having the flange 27 thereon from which a stub shaft 28 extends, which is mounted in a suitable bearing 29 provided on each of the agitator arms 24, the bearing member being detachably mounted on the agitator arm 24 by suitable fastening elements 30.

Instead of providing a mounting for the agitator bars provided with my improved gripping means such as shown in FIGS. 3 and 4, the agitator bar 25', shown in FIGS. 5 and 6, may be provided so as to be mounted in fixed position on the agitator arm 24'. The agitator bar 25' is secured in fixed position on the outer end of the arm 24' by means of suitable fastening elements 30', which extend into a plug 26' provided on the agitator bar 25', having a flange 27'. It is, of course, to be understood that the plugs 26 and 26' are mounted in fixed position on the agitator bars. While the agitator bar 25' is shown as being associated with the mixer bowl shown in FIG. 2 and the agitator bar is shown as being associated with the mixer bowl shown in FIG. 1, is is to be understood that such a mounting of the bars as shown in FIGS. 3 and 4 could be used on either type of dough mixer bowl shown and the same is true of the mounting shown in FIGS. 5 and 6.

The gripping means on the agitator bars may be made in various ways, several different forms of gripping means being shown in FIGS. 7 to 12 inclusive. While the forms of gripping means shown in FIGS. 7 and 8 are shown in FIGS. 3 and 5 of the drawings respectively, it is to be understood that the agitator bars 25 or 25' shown in FIGS. 1 to 6 inclusive can be provided with any of the gripping means shown in FIGS. 7 to 12 inclusive.

Preferably ribs that run lengthwise of the agitator bar or parallel to its axis, that are continuous from end to end of the bar are provided. Such ribs are shown in FIGS. 3 and 5 of the drawing. In FIG. 8 the agitator bar is shown as being provided with a tubular body portion 25' which has the parallel longitudinal ribs 31 provided thereon. The ribs 31 are rectangular in cross section, to provide blunt extremities thereon, and grooves 32 between the same are of substantially uniform width throughout their depth. While the ribs shown in FIG. 8 provide a great amount of gripping surface, it would be somewhat difficult to clean the dough out of the grooves 32, in this form of the invention.

The problem of cleaning out the spaces between the ribs can be reduced or substantially eliminated by providing the form of gripping means shown in FIGS. 3 and 7 in which the ribs 33, running lengthwise of the agitator bar, and having blunt extremities are provided on the tubular body portion 25, grooves 34 being formed between the ribs 33, said grooves 34 flaring outwardly so as to prevent the sticking of the dough in the same. This is accomplished by providing inclined side wall portions 35 on said ribs extending from the wide flat top surfaces 36 thereof and more sharply inclined side wall portions 37 extending to the bottoms of the grooves 34. The blunt ribs 33 extend the full length of the agitator bars and parallel to the axis of each of said bars. As will be obvious from FIG. 7, the ribs are uniformly spaced around the periphery of the body portion 25.

Figures 9, 10:
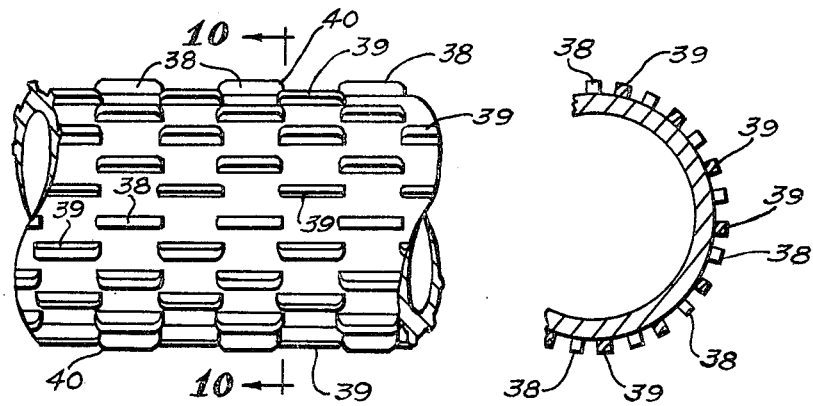
FIG. 9 is a fragmentary elevational view of an agitator bar having another form of gripping means.
FIG. 10 is a fragmentary sectional view, partly broken away, taken on the line 10—10 of FIG. 9.

In FIGS. 9 and 10 another form of gripping means for the agitator bar is shown, the agitator bar having a tubular body portion and being provided with ribs 38 and 39, which are short and are arranged in rows extending parallel to the axis of the agitator bar, the length of each of the ribs 38 and 39 extending in the direction of the row or in other words, in a direction parallel to the axis of the agitator bar. The ribs 38 are spaced endwise from each other as will be obvious from FIG. 9, as are the ribs 39, but the ribs 38 alternate with the ribs 39 so that they are in staggered relation with respect to each other around the agitator bar. The top edges of the ribs 38 and 39 may be curved, if desired, as shown in FIG. 9 at 40. The ribs 38 and 39 are all straight, in the direction of their length, and are uniformly spaced from each other in the row as well as circumferentially of the agitator bar. In this form of gripping means the full length of each of the gripping members 38 and 39 extends transversely of the direction of movement of the agitator bar through the dough and with respect to the adjacent dough mixer bowl wall.

Figures 11, 12:
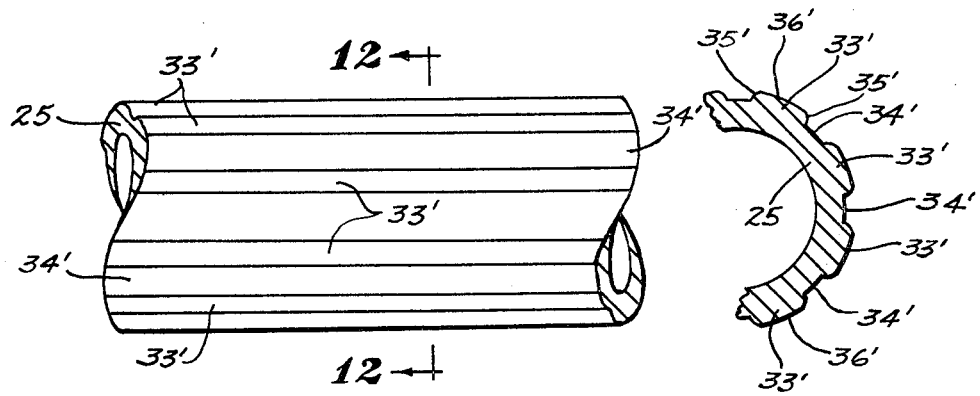
FIG. 11 is a view similar to FIG. 9 of an agitator bar provided with a slightly modified form of my improved gripping means.
FIG. 12 is a fragmentary sectional view, partly broken away, taken on the line 12—12 of FIG. 11.
Figure 13:
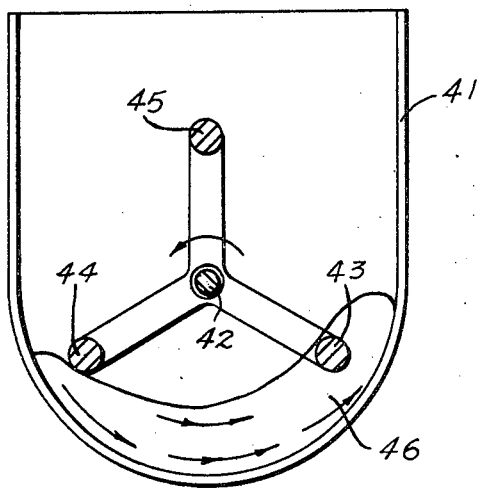
FIG. 13 is a diagrammatic view in vertical section through a dough mixer provided with agitator bars that are smooth surfaced showing the position of the dough and gluten strand orientation as the mixing operation commences.

In FIGS. 11 and 12 a slightly modified form of gripping means is shown, the gripping means being a slight variation from that shown in FIGS. 3 and 7. The agitator bar 25 is provided with grooves 34' which are cut into the surface of the tubular body portion of the bar at regular spaced intervals to provide the blunt ribs 33' running lengthwise of the bar, substantially the full length thereof, the grooves flaring outside in a similar manner to that shown in FIGS. 3 and 7, providing convexly curved inclined side walls 35' on the ribs extending from the approximately flat bottom on the ribs extending from the approximately flat bottom faces of the grooves 34' to the wide approximately flat top surfaces 36' of the ribs 33'. The top surface 36' of the ribs 33' are very slightly curved but act substantially as a flat surface. The blunt ribs 33' are uniformly spaced around the periphery of the body portion of the bar substantially as in the form of the invention shown in FIGS. 3 and 7.

Referring now to FIGS. 13 to 16 inclusive, a dough mixer bowl 41 is shown diagrammatically therein provided with agitating means rotating about the axis of the shaft 42, said shaft being shown with arms extending therefrom and rotating therewith, on the outer ends of which are mounted the smooth surface agitator bars 43, 44 and 45. While three agitator bars are shown, any desired uniformly spaced number of agitator bars may be provided. A mass of dough 46 is shown in the bottom portion of the bowl in FIG. 13, and it is being pulled in the direction indicated by the arrows in FIG. 13 by the agitator bar 43, and the agitator bar 44 is just beginning to engage the mass of dough 46, the direction of rotation of the agitating means being indicated by the arrow in FIG. 13.

Figure 14:
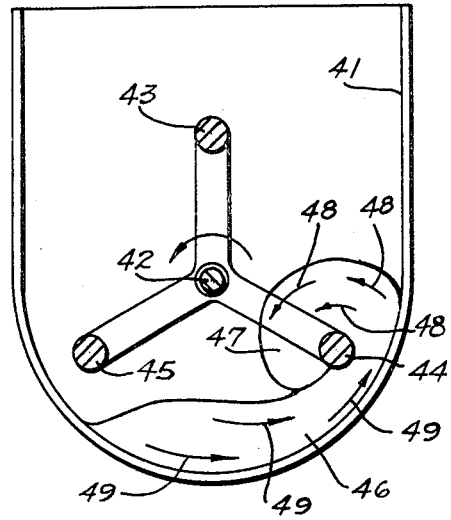
FIG. 14 is a similar view showing the position of the dough after the agitator bars have begun the kneading operation of the dough.

In FIG. 14 the mass of dough has been disengaged by the agitator bar 43 and the agitator bar 44 has pulled the dough into the position shown in FIG. 14, the agitator bar 44 having entered into the mass of dough in a manner to cause a fold in the mass of dough 46 with a portion 47 of the mass of dough 46 having been turned back on itself, the movement of the dough, due to the action of the successive agitator bars, having become such that the turned back portion 47 of the dough 46 has the gluten strands extending backwards, as indicated by the arrow 48, with respect to the gluten strands in the main mass, indicated by the arrows 49 in FIG. 14, this being due to the fact that the dough is slipping relative to the agitator bar 44 and is clinging to the wall of the dough mixer bowl 41.

Figure 15:
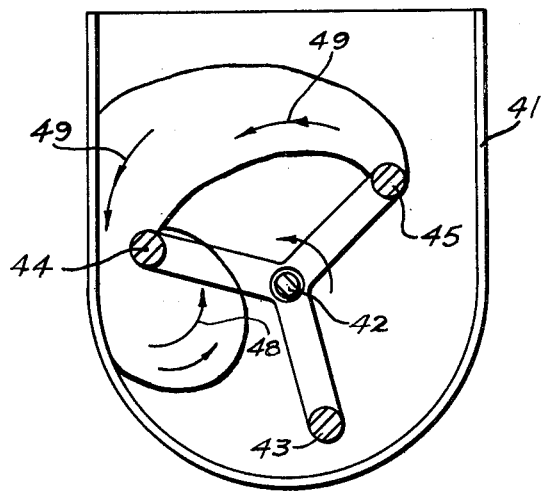
FIG. 15 is a similar view showing a further stage of the mixing operation, with the dough mass having been flipped over from one side of the dough mixer bowl to the other side.

In FIG. 15 a further advanced position of the agitator bars is shown. The agitator bar 43 now having reached a low position, and the agitator bar 44 having succeeded in throwing the mass of dough across the upper portion of the dough mixer out of contact with the right-hand wall of the bowl 41 and into engagement with the left-hand wall thereof, the gluten strands 48 and 49 extending substantially as shown by the arrows in FIG. 15.

Figure 16:
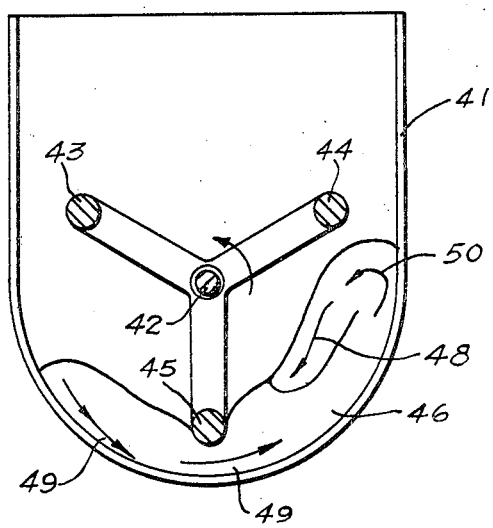
FIG. 16 is a similar view showing the continuing action of the smooth surfaced agitator bars on the mass of dough.

Referring now to FIG. 16 both the agitator bars 43 and 44 are shown as having moved out of engagement with the mass of dough and the agitator bar 45 has now engaged with the dough mass 46, due to the action of the dough mixer bowl will of holding back the movement of the dough mass 46. Due to the poor gripping action of the smooth surfaced agitator bar 45, allowing the dough mass to partially fall over, or back up on itself, the agitator bar 45 will impart a further stretching action to a portion of the dough and a compressing effect on the previously stretched folded over portion of the dough mass 46. The direction in which the gluten has been now stretched in different portions of the dough mass 46 are indicated by the arrows 48, 49 and 50 in FIG. 16.

As a result of the action of the agitator bars 43, 44 and 45, with smooth surfaces, in cooperation with the dough mixer bowl wall, the engagement of the agitator bars with the dough to exert a pulling action thereon will be intermittent, being substantially zero when the dough is being thrown from a position in engagement with the right-hand wall of the mixer bowl, into engagement with the left-hand wall of the mixer bowl, as viewed in the drawings, and having maximum engagement with the mass of dough when it is in a position shortly after the agitator bar 45 has moved into engagement therewith and the agitator bar 44 is still moving the dough mass along the bowl wall. This causes not only an intermittent load on the driving means for the mixer, but causes some of the gluten to be stretched in one direction and the rest of the gluten being stretched in the opposite direction and compressed. As the mixing continues it will be obvious that all of the dough will have been subjected to pulling actions in more than one direction and compression alternately which it has been found is not desirable to produce the development of the dough uniformly and in minimum mixing time.

Figure 17:
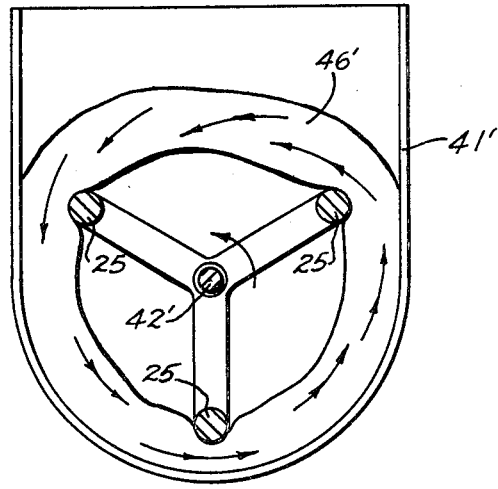
FIG. 17 is a similar view showing the position of the dough in the mixer during the mixing operation with agitator bars provided with my improved gripping means.

Referring now to FIG. 17, a dough mixer bowl 41 is shown in which agitating means is shown as rotating about the axis of the shaft 42. Agitator bars 25 are shown as being provided on the arms of the agitating means, said bars 25 being provided with alternating ribs and grooves such as shown, for example, in FIGS. 3, 7, 11 and 12 of the drawings. Due to the gripping action of the agitator bars 25, the dough mass 46', shortly after starting the mixer, moved into the position shown in FIG. 17 with substantially a uniform amount of the dough located at all points around the axis of the shaft 42' as the dough mass is continuously pulled in one direction by the gripping means on the agitator bars 25 in all positions thereof, a pull being exerted on the dough as it is moved around the upper path of its movement, as well as while it is in engagement with the dough mixer bowl wall. As a result the dough is not tossed about in the mixer bowl but assumes an annular path about the axis of the shaft 42', and the action of the gripping means in cooperation with the retarding action of the stationary wall of the bowl, causes the dough to be pulled always in the same direction about the axis of the shaft 42' by the agitating means. Thus the stretching of the gluten is always in the same direction. As a result the gluten is developed in the dough in less mixing time than where smooth surfaced agitator bars are provided, even though the smooth surfaced agitator bars are located in the same position with respect to the axis of rotation of the agitating means and the wall of the dough mixer bowl, as are the agitator bars 25 provided with the gripping means herein described.

What I claim is:

1. The combination with a dough container having a wall portion curved about an axis lying within said container and agitating means in said container rotating about said axis, said agitating means including a plurality of agitator bars mounted in a circular series to successively pass in proximity to said curved wall portion during rotation of said agitating means about said axis, said bars ears having dough gripping ribs thereon extending longitudinally of said bars, said ribs having blunt wide faced extremities.

2. The combination claimed in claim 1 in which the agitator bare are mounted on said agitating means to each rotate about its axis.

3. The combination claimed in claim 1 in which the agitator bars are mounted in fixed position on said agitating means.

4. The combination claimed in claim 1 in which said ribs extend continuously lengthwise of said bars, have wide top faces and inclined side walls and are spaced uniformly around said bars to provide outwardly widening longitudinally extending wide shallow grooves in said bars alternating with said ribs.

5. The combination claimed in claim 1 in which the agitator bars are each provided with longitudinally extending spaced parallel ribs rectangular in cross section to provide said gripping means.

6. The combination claimed in claim 1 in which said ribs are short and spaced longitudinally and transversely of each of said bars.

7. The combination claimed in claim 1 in which the extremities of said ribs are substantially flat.

8. The combination claimed in claim 1 in which said ribs are spaced to provide grooves therebetween and have side walls that have inclined portion extending in diverging relation from the top faces thereof and more sharpely inclined portions extending to the bottoms of said grooves.

9. The combination claimed in claim 1 in which said ribs have diverging convexly curved side walls.

10. The combination claimed in claim 1 in which said bars are mounted in uniformly spaced relation at uniform radial distances from said axis.

11. In the method of developing a dough, agitating a mass of dough in a container to stretch the gluten in said mass constantly in the same direction by rotating a plurality of uniformly spaced dough gripping members about an axis traversing said container with said members in engagement with uniformly spaced portions of said dough mass, said gripping members rotating in a circular path that approaches a wall portion curved about said axis, extends in proximity to said wall portion and recedes from said wall portion, to roll said gripping member relative to said wall portion, while in proximity thereto, and pull on said dough mass continuously in the same direction of rotation to maintain a continuous stream of said dough about said axis as a center.

References Cited

UNITED STATES PATENTS

| | | | |
|---|---|---|---|
| 2,218,433 | 10/1940 | Mullner | 259—84 |
| 2,261,257 | 11/1941 | Kiesskalt et al. | |
| 2,502,563 | 4/1950 | Goodchild | 259—6 |
| 2,593,705 | 4/1952 | Sticelber | 259—109 XR |
| 3,155,056 | 11/1964 | Smith et al. | 107—36 |

WALTER A. SCHEEL, Primary Examiner

ARTHUR O. HENDERSON, Assistant Examiner

U.S. Cl. X.R.

107—54; 259—109

UNITED STATES PATENT OFFICE
CERTIFICATE OF CORRECTION

Patent No. 3,503,344                                       March 31, 1970

George P. Sternberg

It is certified that error appears in the above identified patent and that said Letters Patent are hereby corrected as shown below:

Column 8, line 1, "ears" should read -- each --; line 27, "portion" should read -- portions --.

Signed and sealed this 8th day of December 1970.

(SEAL)
Attest:

Edward M. Fletcher, Jr.
Attesting Officer

WILLIAM E. SCHUYLER, JR.
Commissioner of Patents